(12) United States Patent
Mancl et al.

(10) Patent No.: US 10,156,240 B2
(45) Date of Patent: Dec. 18, 2018

(54) MOTOR-DRIVEN FAN WITH TRAPPED ADHESIVE FOR MINIMIZING VIBRATION

(71) Applicants: Scott C. Mancl, Johnson City, TN (US); Dennis J. Mancl, Bluff City, TN (US)

(72) Inventors: Scott C. Mancl, Johnson City, TN (US); Dennis J. Mancl, Bluff City, TN (US)

( * ) Notice: Subject to any disclaimer, the term of this patent is extended or adjusted under 35 U.S.C. 154(b) by 184 days.

(21) Appl. No.: 15/291,213

(22) Filed: Oct. 12, 2016

(65) Prior Publication Data

US 2017/0363110 A1     Dec. 21, 2017

Related U.S. Application Data

(60) Provisional application No. 62/350,922, filed on Jun. 16, 2016.

(51) Int. Cl.
*F04D 29/66* (2006.01)
*F04D 29/02* (2006.01)
(Continued)

(52) U.S. Cl.
CPC ........ *F04D 25/0606* (2013.01); *B05B 7/0081* (2013.01); *F04D 17/164* (2013.01); *F04D 29/023* (2013.01); *F04D 29/263* (2013.01); *F04D 29/281* (2013.01); *F04D 29/30* (2013.01); *F04D 29/626* (2013.01); *F04D 29/668* (2013.01); *H02K 5/1732* (2013.01);
(Continued)

(58) Field of Classification Search
CPC ........ F04D 1/06; F04D 17/122; F04D 29/023; F04D 29/056; F04D 29/28; F04D 29/4226; F04D 29/668; H02K 7/08; H02K 7/14; H02K 13/006
USPC ....................................................... 417/423.7
See application file for complete search history.

(56) References Cited

U.S. PATENT DOCUMENTS 2,263,842 A   9/1941  Gross
2,829,286 A   4/1958  Britz
(Continued)

OTHER PUBLICATIONS

Coefficients of Linear Expansion, The Engineering Toolbox, Captured by the the Wayback Machine on Feb. 17, 2011.*
(Continued)

*Primary Examiner* — Dominick L Plakkoottam
*Assistant Examiner* — Connor J Tremarche
(74) *Attorney, Agent, or Firm* — bobharter.com; Robert J. Harter

(57) ABSTRACT

HVLP (High Velocity Low Pressure) motor-driven fans and other types of fans, blowers and vacuums take advantage of different thermal and mechanical properties of dissimilar materials used in the motor-driven fans. The dissimilar materials include aluminum for a stacked arrangement of fan wheels and spacers, steel for a shaft that supports the fan wheels and spacers, and a polymeric adhesive. In some examples, the polymeric adhesive is trapped between the aluminum and steels parts. Compared to steel and aluminum, the adhesive has a relatively high coefficient of thermal expansion but relatively low strength such that thermal expansion of the adhesive exerts additional clamping pressure during startup and during high temperature operation. The additional clamping pressure reduces vibration and eliminates other causes of fan or motor failure.

11 Claims, 16 Drawing Sheets

(51) Int. Cl.
  F04D 17/12     (2006.01)
  F04D 25/06     (2006.01)
  F04D 29/28     (2006.01)
  F04D 29/056    (2006.01)
  F04D 29/42     (2006.01)
  H02K 7/08      (2006.01)
  H02K 7/14      (2006.01)
  H02K 13/00     (2006.01)
  H02K 7/00      (2006.01)
  B05B 7/00      (2006.01)
  F04D 17/16     (2006.01)
  F04D 29/26     (2006.01)
  F04D 29/30     (2006.01)
  F04D 29/62     (2006.01)
  H02K 5/173     (2006.01)

(52) U.S. Cl.
  CPC .......... *H02K 7/003* (2013.01); *H02K 7/08* (2013.01); *H02K 7/083* (2013.01); *H02K 7/14* (2013.01); *H02K 13/006* (2013.01); F04D 29/056 (2013.01); F05D 2230/54 (2013.01); F05D 2240/304 (2013.01)

(56) References Cited

U.S. PATENT DOCUMENTS

| | | |
|---|---|---|
| 2,905,267 A | 9/1959 | Thompson |
| 3,056,608 A | 10/1962 | Flynn |
| 3,060,335 A | 10/1962 | Greenwald |
| 3,087,078 A | 4/1963 | Brown |
| 3,159,354 A | 12/1964 | Yartz et al. |
| 3,179,143 A * | 4/1965 | Schultz ............ F16B 39/225 156/310 |
| 3,371,613 A | 3/1968 | Dahlgren et al. |
| 3,443,519 A | 5/1969 | White |
| 3,525,001 A | 8/1970 | Erickson |
| 3,626,225 A | 12/1971 | Pauwels |
| 3,653,785 A | 4/1972 | Dahlgren et al. |
| 3,733,150 A | 5/1973 | Porter et al. |
| 3,875,462 A | 4/1975 | Kiefer et al. |
| 3,932,070 A | 1/1976 | Porter et al. |
| 4,088,424 A | 5/1978 | Hyatt et al. |
| 4,139,203 A | 2/1979 | Garrison |
| 4,174,070 A | 11/1979 | Lau et al. |
| 4,194,745 A | 3/1980 | Mcdougal |
| 4,226,575 A | 10/1980 | Hyatt et al. |
| 4,315,343 A | 2/1982 | Neroda et al. |
| 4,347,442 A | 8/1982 | White et al. |
| 4,429,204 A | 1/1984 | McGuire et al. |
| 4,433,812 A | 2/1984 | Grime |
| 4,513,214 A | 4/1985 | Dieringer |
| 4,527,960 A | 7/1985 | DeSisto |
| RE32,027 E | 11/1985 | Hyatt et al. |
| 4,621,991 A | 11/1986 | Smith et al. |
| 4,698,534 A | 10/1987 | Smith et al. |
| 4,798,984 A | 1/1989 | Suzuki et al. |
| 4,838,763 A | 6/1989 | Kramer et al. |
| 4,865,332 A | 9/1989 | Ruetz |
| 4,890,988 A | 1/1990 | Kramer et al. |
| 5,307,994 A | 5/1994 | Hieronymus |
| 5,313,129 A | 5/1994 | Stewart |
| 5,482,378 A | 1/1996 | Vona, Jr. et al. |
| 5,616,973 A | 4/1997 | Khazanov et al. |
| 5,655,714 A | 8/1997 | Kieffer et al. |
| 5,661,356 A | 8/1997 | Fisher |
| 5,704,717 A | 1/1998 | Cochimin |
| 5,726,511 A | 3/1998 | Kusase et al. |
| 5,803,367 A | 9/1998 | Heard et al. |
| 5,894,180 A | 4/1999 | Volz et al. |
| 6,158,083 A | 12/2000 | Holsten |
| 6,247,702 B1 | 6/2001 | Long et al. |
| 6,316,856 B1 | 11/2001 | Kusaki et al. |
| 6,379,127 B1 | 4/2002 | Andrews et al. |
| 6,472,786 B1 | 10/2002 | McCauley et al. |
| 6,685,445 B2 | 2/2004 | Huang-Chang |
| 6,692,202 B2 | 2/2004 | Katsuzawa et al. |
| 6,702,203 B2 | 3/2004 | Jou |
| 6,715,765 B2 | 4/2004 | Machida |
| 6,779,964 B2 | 8/2004 | Dial |
| 6,796,514 B1 | 9/2004 | Schwartz |
| 6,952,062 B1 | 10/2005 | Mancl |
| 6,987,338 B1 | 1/2006 | Lavasser |
| 7,011,452 B2 | 3/2006 | Suzuki et al. |
| 7,117,961 B2 | 10/2006 | Yong et al. |
| 7,265,468 B1 * | 9/2007 | Mancl ............ H02K 5/10 310/54 |
| 7,291,192 B1 | 11/2007 | Lavasser |
| RE41,212 E | 4/2010 | Lavasser |
| 7,758,788 B2 * | 7/2010 | Job ............ A61F 2/12 264/255 |
| 8,297,949 B1 * | 10/2012 | Mancl ............ F04D 17/164 417/423.11 |
| 8,387,898 B1 | 3/2013 | Mancl et al. |
| 2003/0001444 A1 | 1/2003 | Coles et al. |
| 2003/0095862 A1 * | 5/2003 | Kawanishi ........ F04D 19/04 415/90 |
| 2003/0116921 A1 | 6/2003 | Coles et al. |
| 2004/0170346 A1 | 9/2004 | Komeda et al. |
| 2006/0033317 A1 | 2/2006 | Stevens |
| 2006/0071097 A1 | 4/2006 | Glauser et al. |
| 2006/0232880 A1 * | 10/2006 | Xu ............ G11B 17/0281 360/99.12 |
| 2009/0200435 A1 * | 8/2009 | Duggan ............ F16L 3/12 248/74.1 |
| 2009/0280004 A1 | 11/2009 | Finkenbinder |
| 2011/0150630 A1 | 6/2011 | Takarai |
| 2013/0046228 A1 * | 2/2013 | Bourne ............ A61M 1/0039 604/22 |

OTHER PUBLICATIONS

Modulus of Elasticy—Young Modulus for some Common Materials, The Engineering Toolbox, Captured by the the Wayback Machine on Feb. 9, 2014.*

* cited by examiner

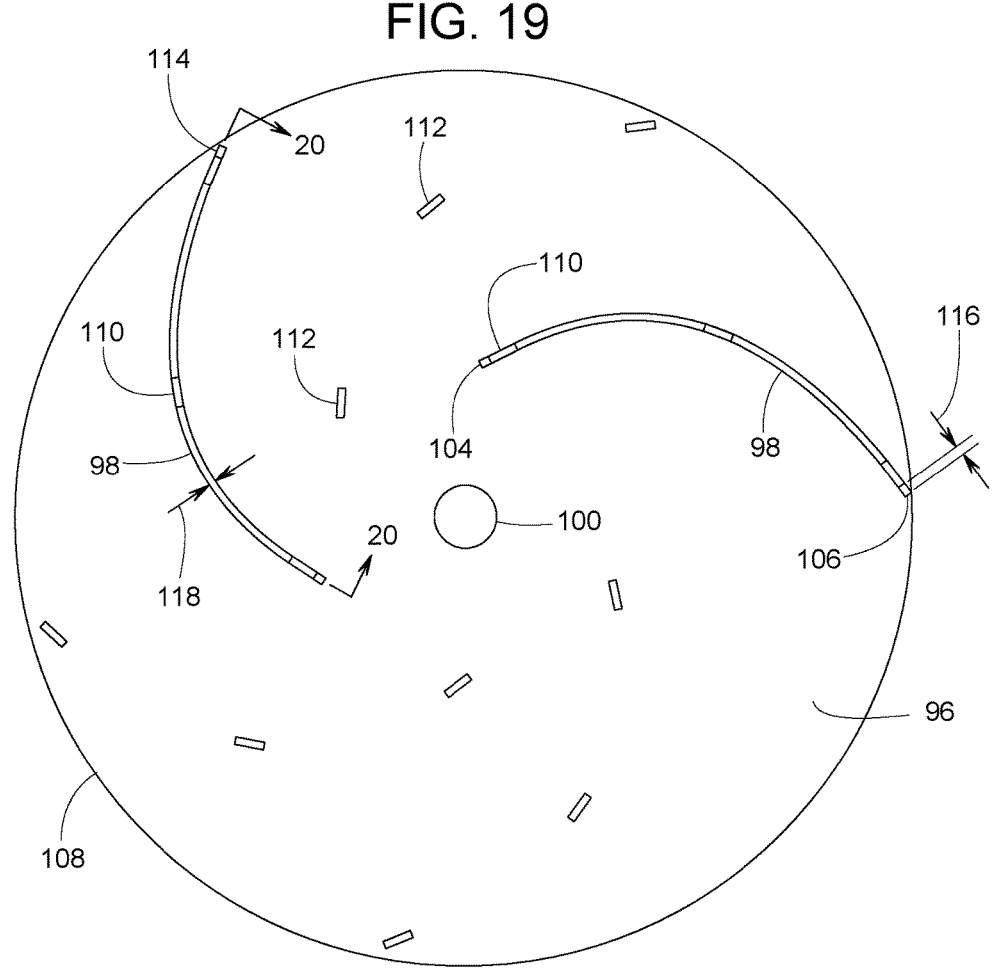
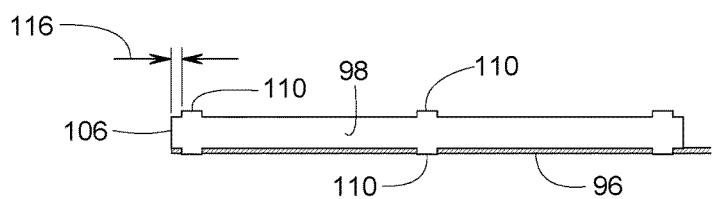
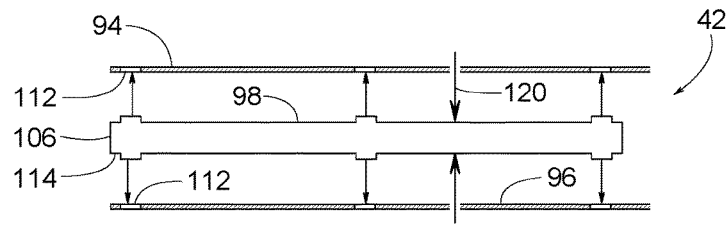

MOTOR-DRIVEN FAN WITH TRAPPED ADHESIVE FOR MINIMIZING VIBRATION

CROSS REFERENCE TO RELATED APPLICATIONS

This application claims the benefit of provisional patent application Ser. No. 62/350,922 filed on Jun. 16, 2016 by the present inventor and specifically incorporated herein by reference.

FIELD OF THE DISCLOSURE

This disclosure generally pertains to motor-driven fans and more specifically to means for minimizing vibration and strain.

BACKGROUND

High-velocity low pressure fans, sometimes known as HVLP fans or turbines, typically comprise a multi-stage stacked series of fan wheels driven by a high speed motor. The term, "HVLP," as used herein, refers to high-velocity low-pressure fans operating at 15,000 to over 30,000 rpm for compressing air to less than 15 psig, and delivering air up to 10 psig to a paint sprayer.

BRIEF DESCRIPTION OF THE DRAWINGS

FIG. 19 is a bottom view similar to FIG. 18 but with the upstream disk omitted and four fan blades omitted.

FIG. 20 is view taken along line 20-20 of FIG. 19.

FIG. 21 is a view similar to FIG. 20 but an exploded version of it with two fan disks.

DETAILED DESCRIPTION

Figure 1:
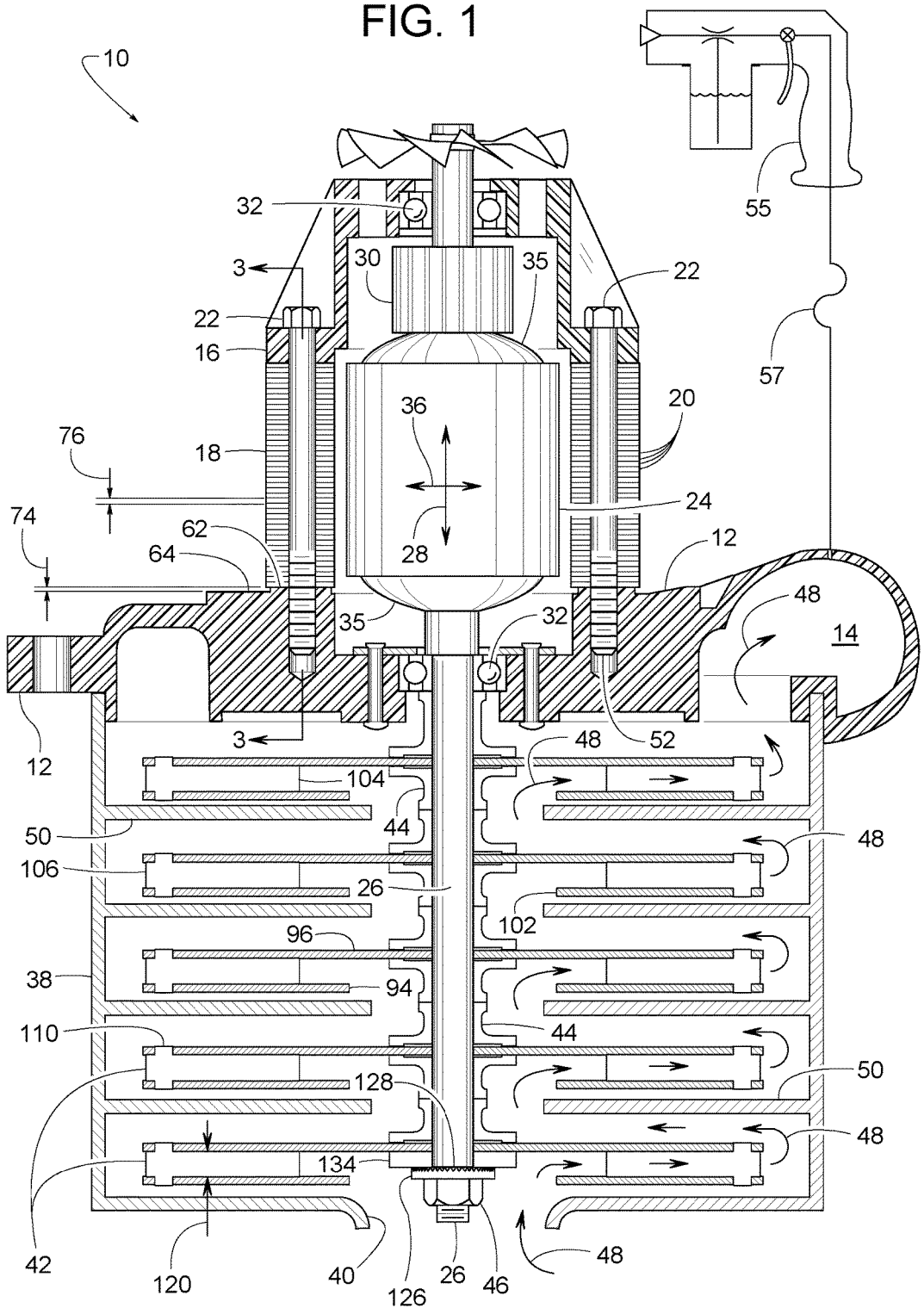
FIG. 1 is a front cross-sectional view of an example motor-driven fan constructed in accordance with the teachings disclosed herein.

FIGS. 1-22 show an example motor-driven fan 10 and variations thereof. In some examples, motor-driven fan 10 comprises an inboard bracket 12 defining an air outlet 14; an outboard bracket 16; a stator 18 comprising a plurality of laminations 20; a screw 22 clamping stator 18 between inboard bracket 12 and outboard bracket 16; an armature rotor 24 comprising a steel shaft 26 being elongate in an axial direction 28, a known commutator 30 supported by shaft 26, and a set of windings 35 being electrically coupled to commutator 30; and a set of bearings 32 mounted to at least one of inboard bracket 12 and outboard bracket 16. Bearings 32 provide shaft 26 with support in a radial direction 36 that is perpendicular to axial direction 28. Bearings 32 also support shaft 26 in axial direction 28 so as to centrally position windings 35 proximate stator 18.

Motor-driven fan 10 also includes a fan housing 38 connected to inboard bracket 12. Fan housing 38 (comprising one or more components) defines an air inlet 40 that is in fluid communication with outlet 14 of inboard bracket 12. A plurality of aluminum fan wheels 42 and a plurality of aluminum spacers 44 are in an axially stacked arrangement within fan housing 38. A threaded nut 46 fastens the plurality of fan wheels 42 and the plurality of spacers 44 to shaft 26. As shaft 26 of armature 24 rotates fan wheels 42 at 15,000 to 30,000 rpm or more, fan wheels 42 force a current of air 48 from inlet 40 to outlet 14. Stationary dividers 50 direct air 48 sequentially through fan wheels 42. In some examples, dividers 50 include known stationary guide vanes that help direct air 48 in a more efficient flow pattern. Depending on the specific design and operation of motor-driven fan 10, the air pressure at outlet 14 can be up to 15 psig. In vacuum applications, inlet 40 is at subatmospheric pressure. In the example illustrated in FIG. 1, motor-driven fan 10 is part of an HVLP system that delivers up to 10 psig to a paint sprayer 55. A hose 57 connects outlet 14 in fluid communication with paint sprayer 55. More information about paint sprayer 55 is found in U.S. Pat. No. 8,387,898; which is specifically incorporated herein by reference.

The illustrated example of motor-driven fan 10 has what is sometimes referred to as a frameless or skeleton assembly. For the illustrated example, the frameless or skeleton assembly means that at least two screws 22 first go through outboard bracket 16 on top of stator laminations 20, then through laminations 20, and then a threaded end 52 of each screw 22 screws into a corresponding hole 54 in inboard bracket 12. Screws 22 are tightened to securely clamp laminations 20 between brackets 12 and 16. In examples where outboard bracket 16 is made of a glass-filled thermoset plastic (e.g., thermoset polyester glass-filled bulk molding compound, sometimes known as BMC) and inboard bracket 12 is made of a die cast aluminum, tightening of screws 22 might crack outboard bracket 16 due to a combination of factors including the stack of laminations 20 being somewhat compressible, outboard bracket 16 being relatively brittle when made of BMC or certain other plastics, and inboard bracket 12 being relatively strong and rigid when made of die cast aluminum.

Figure 2:
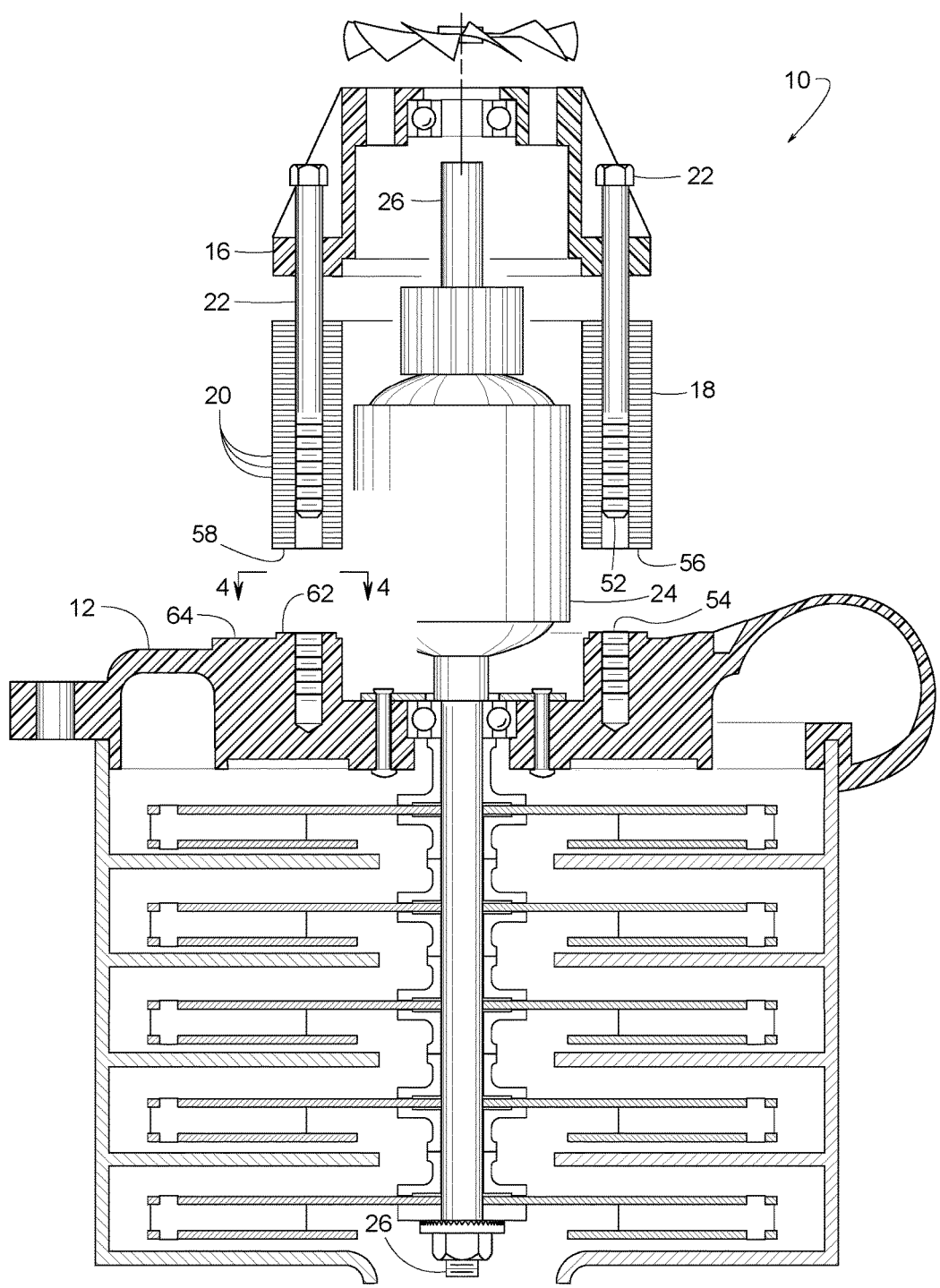
FIG. 2 is a partially exploded front cross-sectional view of the motor-driven fan shown in FIG. 1.

The source of the cracking problem originates with the stack of laminations 20 being slightly compressible. Each sheet of lamination 20 is about 0.018 to 0.030 inches thick, whereby the thin individual sheets or laminations improve the magnetic quality of the stator's core. Each sheet of lamination can have small burrs that cumulatively contribute to the stator's overall height when the laminations are stacked and held together by staking, riveting, clipping and etc. When stator 18 is in an uninstalled position, as shown in FIG. 2, an axial stator face 56 of stator 18 is substantially planar.

During subsequent assembly of the motor, additional compressive force exerted by screws 22 can flatten the burrs, thus laminated stator core 18 acts as a compressible structure. Under the compressive force of screws 22, the lamination core 18 in its installed position (FIGS. 1 and 3) becomes shorter in a localized area 58 where screws 22 are tightened but is taller in outlying areas 60 farther away from screws 22. The outboard thermoset bracket 16 being weaker than the aluminum inboard bracket 12 will try to flex to match the compressed contour of the lamination core 18. Although such flexure can maintain a beneficial axial load on screws 22, the flexure can also cause the outboard thermoset bracket 16 to crack.

Figure 3:
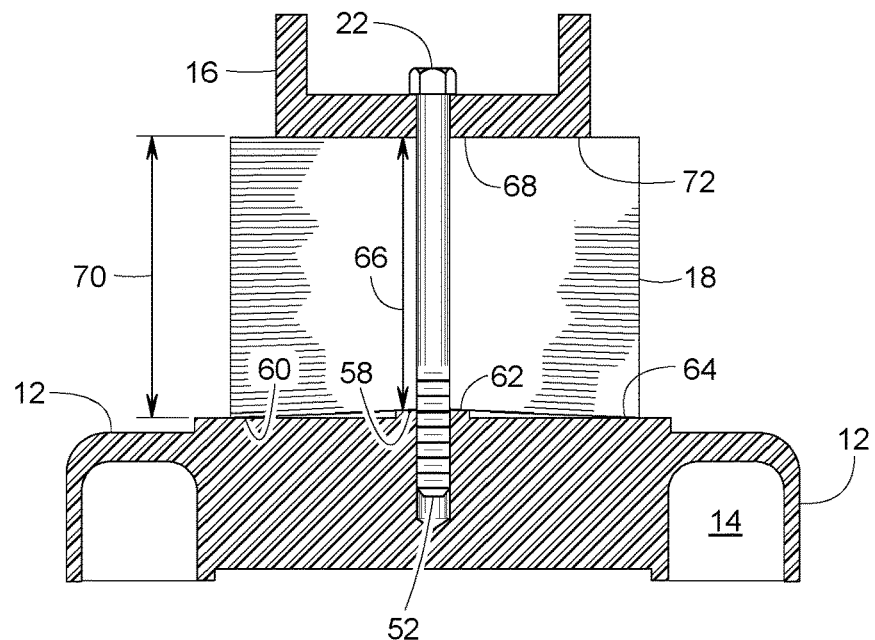
FIG. 3 is a cross-sectional view taken along line 3-3 of FIG. 1.

FIGS. 1-13 illustrate various means for avoiding this problem. In the example shown in FIGS. 1-3, inboard bracket 12 has a protruding first axial surface 62 (e.g., first axial surface 62a, 62b, 62c or 62d) and a recessed second axial surface 64 (axial surfaces 62 and 64 are displaced out of coplanar alignment with each other). When screw 22 tightly clamps laminations 20 between brackets 12 and 16, both surfaces 62 and 64 engage stator face 56 of stator core 18. First axial surface 62 engages localized area 58, and second axial surface 64 engages outlying area 60. In some examples, but not necessarily in all examples, stator 18 is pressed more tightly against first axial surface 62 than against second axial surface 64. FIG. 3, for instance, shows a first axial distance 66 between first axial surface 62 of inboard bracket 12 and a third axial surface 68 of outboard bracket 16 being less than a second axial distance 70 between second axial surface 64 of inboard bracket 12 and a fourth axial surface 72 of outboard bracket 16.

In some examples, it has been discovered that it works best when first axial surface 62 and second axial surface 64 are displaced out of coplanar alignment with each other by an offset axial distance 74 that is less than twice an axial thickness 76 of a single lamination 20, wherein offset axial distance 74 equals second axial distance 70 minus first axial distance 66. In examples where axial thickness 76 of each lamination 20 is between 0.018 and 0.030 inches thick, best results are attained when offset axial distance 74 is between 0.005 and 0.020 inches. Providing inboard bracket 12 with the desired offset axial distance 74 can be achieved by various means. Examples of such means include, but are not limited to, those shown in FIGS. 4-7.

Figure 4:
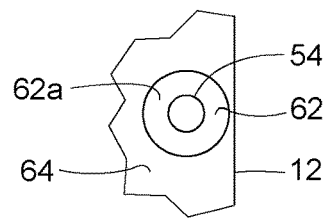
FIG. 4 is a view taken along line 4-4 of FIG. 2.
Figure 5:
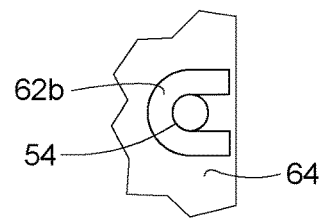
FIG. 5 is a view similar to FIG. 4 but showing another example shape of a thin shim or slightly raised surface adjacent to a recessed surface.
Figure 6:
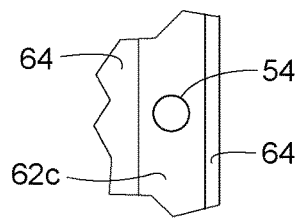
FIG. 6 is a view similar to FIGS. 4 and 5 but showing another example shape of a thin shim or slightly raised surface adjacent to a recessed surface.
Figure 7:
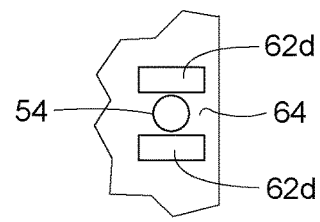
FIG. 7 is a view similar to FIGS. 4-6 but showing another example shape of a thin shim or slightly raised surface adjacent to a recessed surface.

FIG. 4 shows first axial surface 62a being in a circular shape encircling hole 54. FIG. 5 shows first axial surface 62b in a C-shape partially encircling hole 54. FIG. 6 shows first axial surface 62c in a rectangular shape surrounding or adjacent to hole 54. FIG. 7 shows first axial surface 62d comprising multiple pads or bosses adjacent to hole 54.

Figure 8:
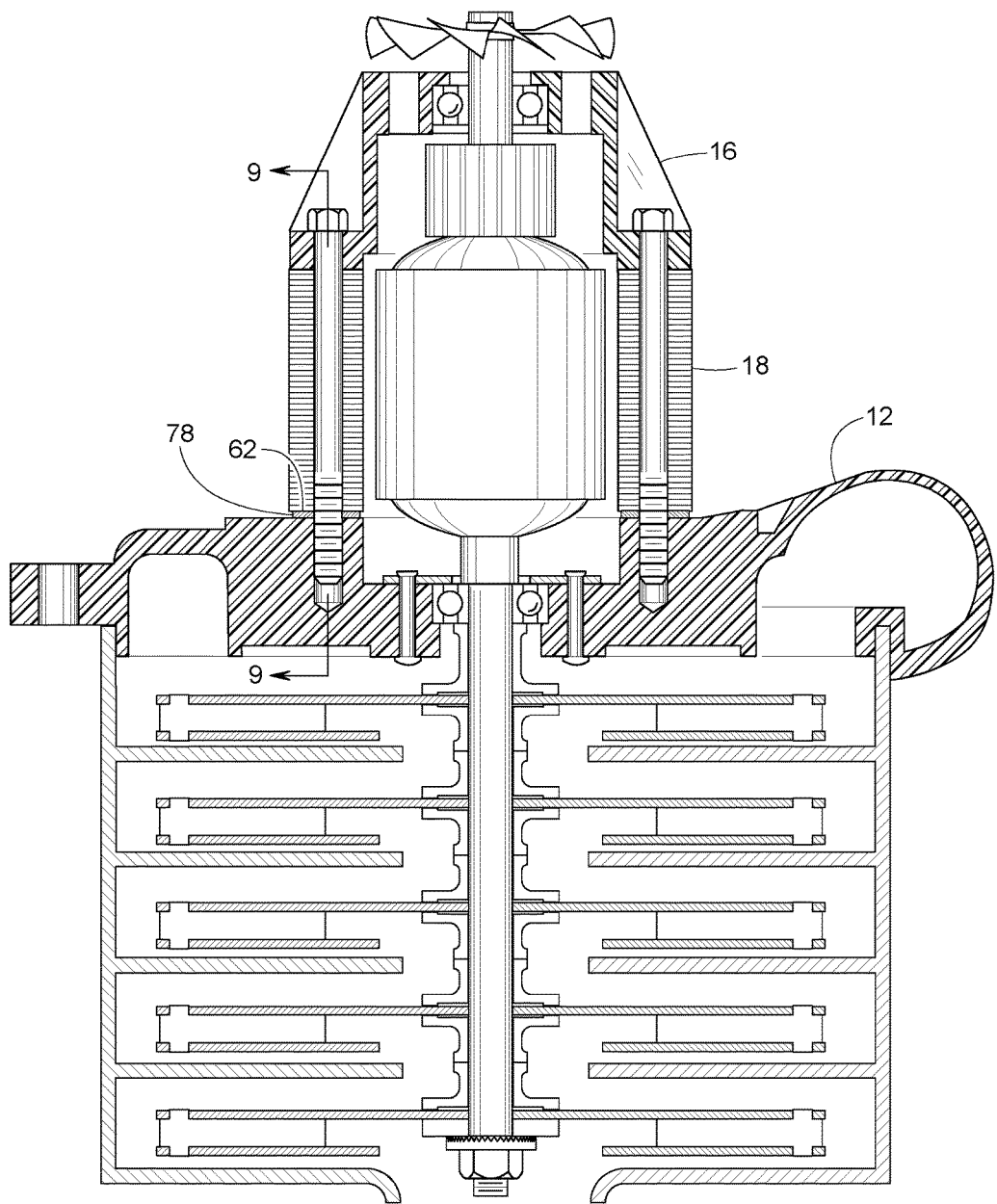
FIG. 8 is a front cross-sectional view similar to FIG. 1 but showing another example motor-driven fan constructed in accordance with the teachings disclosed herein.
Figure 9:
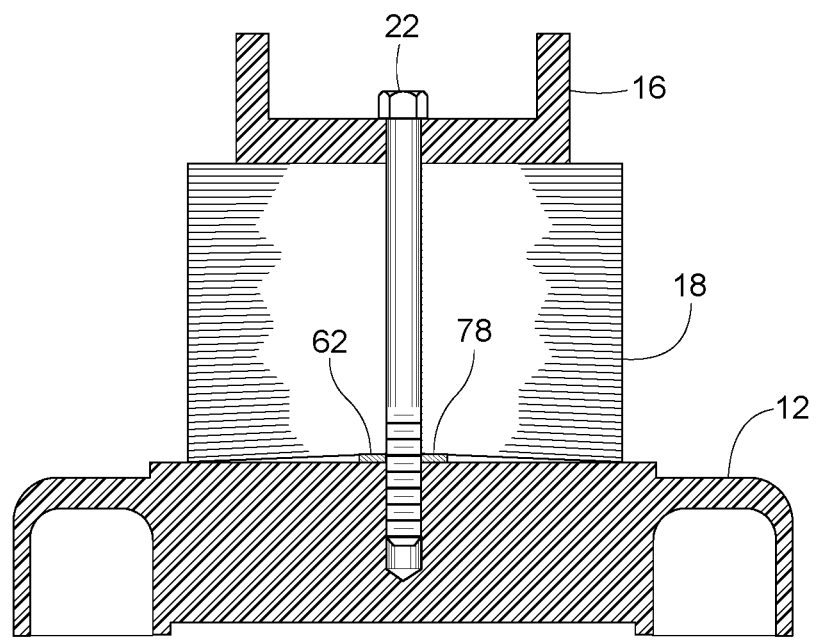
FIG. 9 is a cross-sectional view taken along line 9-9 of FIG. 8.

FIGS. 8-13 show alternate designs for achieving similar results of the design shown in FIGS. 1-3. While first axial surface 62 of FIGS. 1-3 is an integral, seamless protrusion of inboard bracket 12, first axial surface 62 of FIGS. 8 and 9 is provided by an annular shim 78 that provides similar results. In this example, annular shim 78 is considered a component part of inboard bracket 12.

Figure 10:
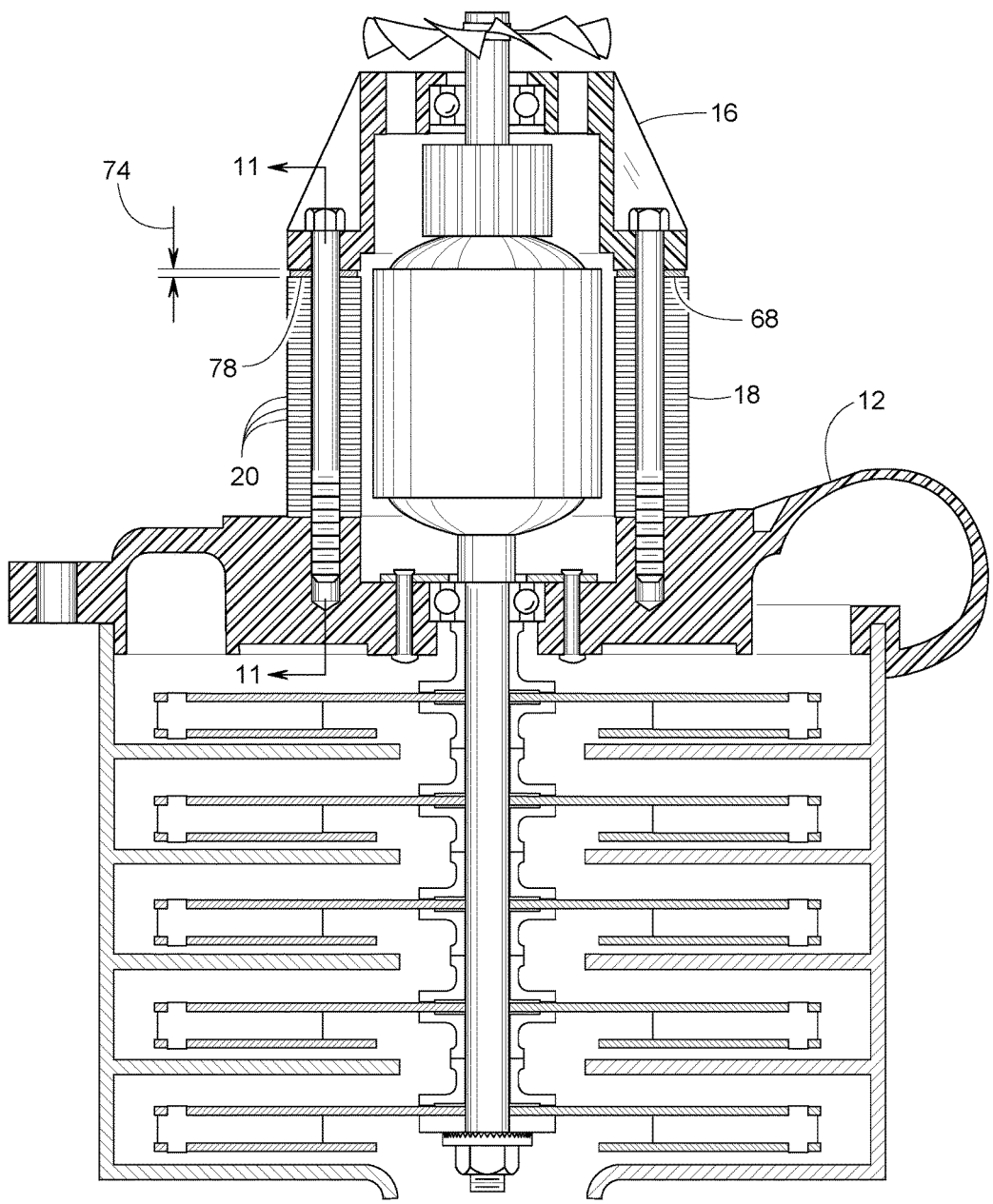
FIG. 10 is a front cross-sectional view similar to FIGS. 1 and 8 but showing another example motor-driven fan constructed in accordance with the teachings disclosed herein.
Figure 11:
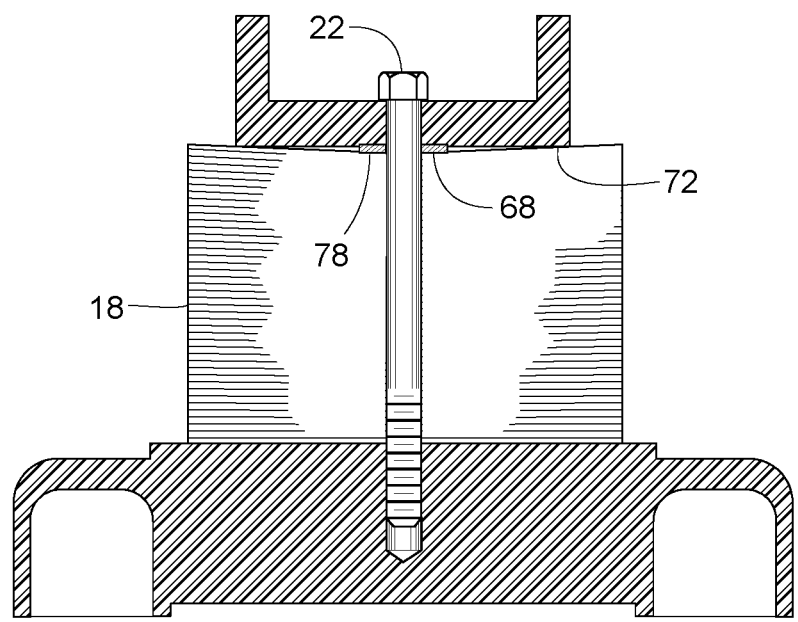
FIG. 11 is a cross-sectional view taken along line 11-11 of FIG. 10.
Figure 12:
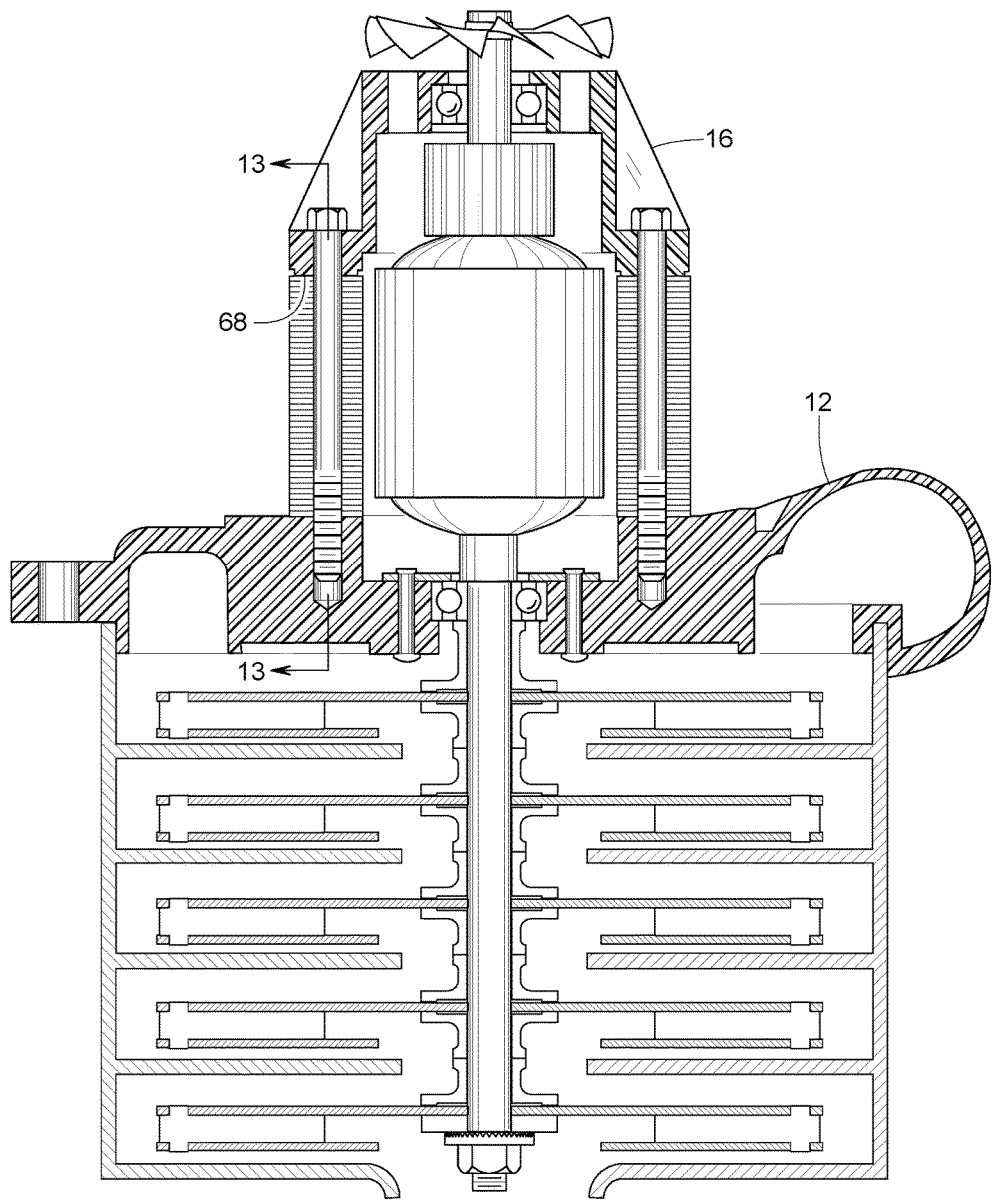
FIG. 12 is a front cross-sectional view similar to FIGS. 1, 8 and 10 but showing another example motor-driven fan constructed in accordance with the teachings disclosed herein.
Figure 13:
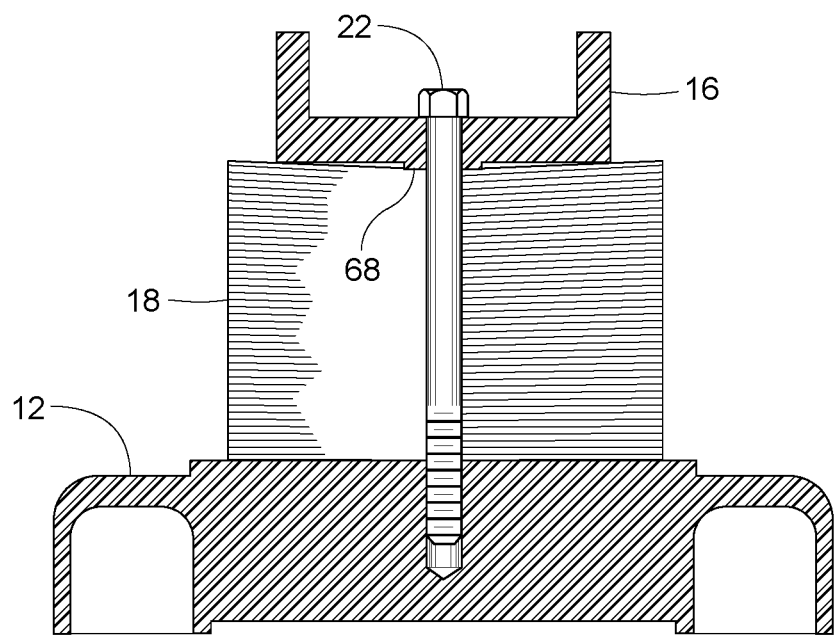
FIG. 13 is a cross-sectional view taken along line 13-13 of FIG. 12.

FIGS. 10 and 11 show annular shim 78 being installed between outboard bracket 16 and laminations 20 to achieve results similar to those of FIGS. 8 and 9. In this example, annular shim 78 is considered a component part of outboard bracket 16. Outboard bracket 16, in this example, includes third axial surface 68 on annular shim 78 and also includes fourth axial surface 72. Third axial surface 68 is adjacent to or at least partially encircles screw 22. Third axial surface 68 and fourth axial surface 72 are displaced out of coplanar alignment with each other, and both engage stator 18. FIGS. 12 and 13 is similar to the design shown in FIGS. 10 and 11; however, FIGS. 12 and 13 show third axial surface 68 being a seamless, integral protrusion of outboard bracket 16.

It should be noted that the concept of using a shim or otherwise protruding axial surface adjacent to screw 22 can be applied to a variety of fan/motor designs. Examples of suitable designs include, but are not limited to, inboard bracket 12 being metal and outboard bracket 16 being plastic (as illustrated), inboard bracket 12 being plastic and outboard bracket 16 being metal, and both brackets 12 and 16 being plastic.

Referring to FIGS. 14-17, the illustrated spacer design is meant to address a thermal expansion problem that can occur with HVLP motor-driven fans that have a combination of aluminum and steel parts. Motor-driven fan 10, for instance, has spacers 44 and fan wheels 42 made of aluminum and shaft 26 made of steel. Aluminum has a relatively high coefficient of thermal expansion (e.g., a CTE of about $22 \times 10^{-6}$ m/mK), and steel has a lower CTE (e.g., about $12 \times 10^{-6}$ m/mK).

Some HVLP motor-driven fans operate with very small exhaust orifices, often in the range of 0.125 to 0.375 inch effective exhaust orifice size range. At this small exhaust orifice size, these HVLP motor-driven fans can generate very high heat, as there is a very low volume of air flowing through the fan wheels to carry the heat away. Fan air temperatures can be in the range of 100-150 degree Celsius. At these high temperatures, the relatively high coefficient of thermal expansion (CTE) for aluminum spacers 44 and aluminum fan wheels 42 versus the lower coefficient of thermal expansion of steel shaft 26 can cause significant quality and reliability problems.

When the motor-driven fan is assembled, a relatively high torque (typically 50-80 in-lbs or higher) is applied to nut 46 securing the whole fan/spacer/shaft assembly together. After the motor-driven fan has been running for a while (perhaps 10 minutes or several hours of continuous run), the rotating parts all become very hot. Because the CTE of the aluminum parts is higher than CTE of the steel shaft, the aluminum parts undergo greater expansion. Since the aluminum parts on shaft 26 are axially constrained between nut 46 and the inner race of inboard bearing 32, the aluminum spacers are forced to expand radially while being more constrained axially. While the motor-driven fan is running, such expansion keeps all the parts tight and secure.

However, a problem may arise when the rotating parts cool back down after the unit is turned off. The parts retract as they cool, so the aluminum spacers might become axially shorter than they were initially. Consequently, nut 46 and the other parts on shaft 26 might not be as secure as they were originally, so the next time the motor-driven fan is started, the parts might spin relative to shaft 26.

To overcome this problem, the axially resilient preload design of spacer 44, shown in FIGS. 14-17 includes a shallow counterbore 80 that helps accommodate the difference in thermal expansion of aluminum spacers 44 and fan wheel 42 with respect to steel shaft 26. In some examples, counterbore 80 is about 0.002 to 0.005 inches deep (e.g., 0.003 inches deep, as indicated by dimension 82 of FIG. 14). When nut 46 is tightened during assembly, counterbore 80 allows spacers 44 to resiliently flex slightly in axial direction 28 such that each fan wheel 42 remains securely supported at the spacer's outer periphery, thus providing better radial retention of fan wheels 42 and reducing the chance of radial slippage of fan wheel 42 relative to shaft 26.

More specifically, in some examples, each spacer 44 (e.g., a first spacer) of the plurality of spacers 44 has a first axial face 82 comprising a first recessed surface 84, a first peripheral rim 86, and a first step 88 extending in axial direction 28 (about 0.002 to 0.005 inches deep, as indicated by dimension 82) between first recessed surface 84 and first peripheral rim 86. Nut 46, when tightened, exerts a nut-clamping force 90 (FIG. 16) that urges first recessed surface 84 and first peripheral rim 86 toward a substantially planar surface 92 of fan wheel 42.

Figure 14:
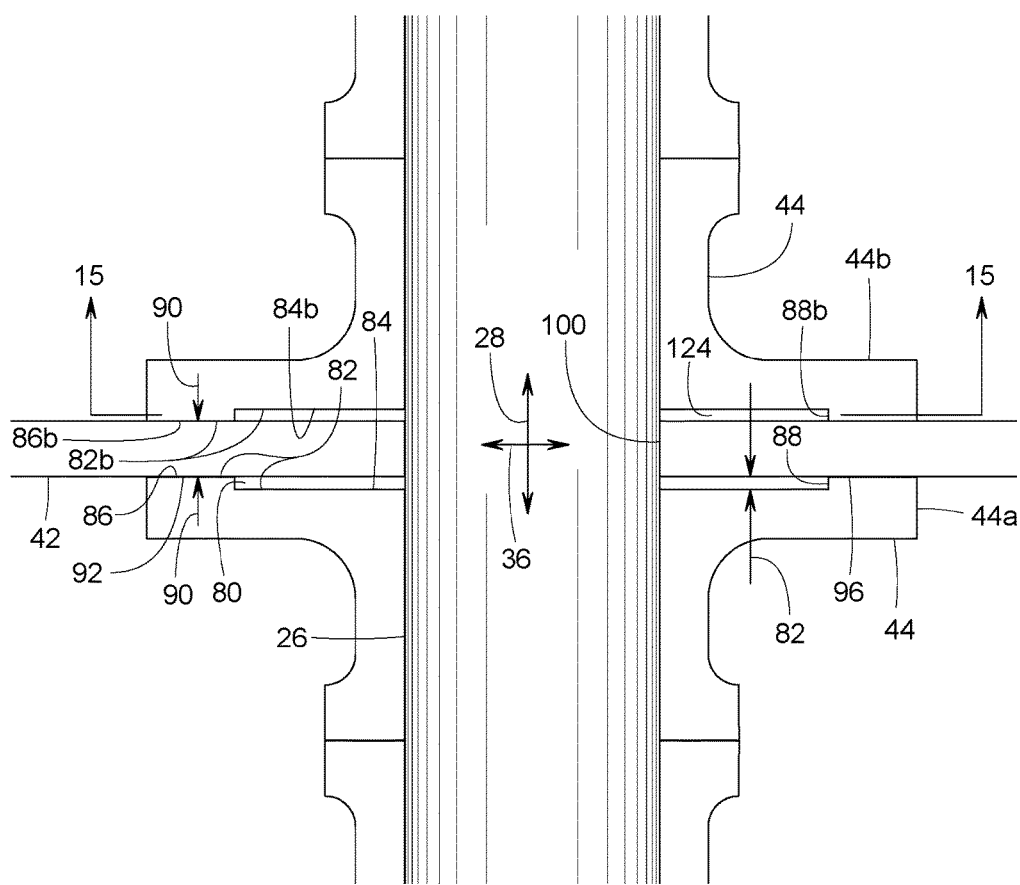
FIG. 14 is an enlarged view of spacers and adjacent parts shown in FIG. 1.
Figure 15:
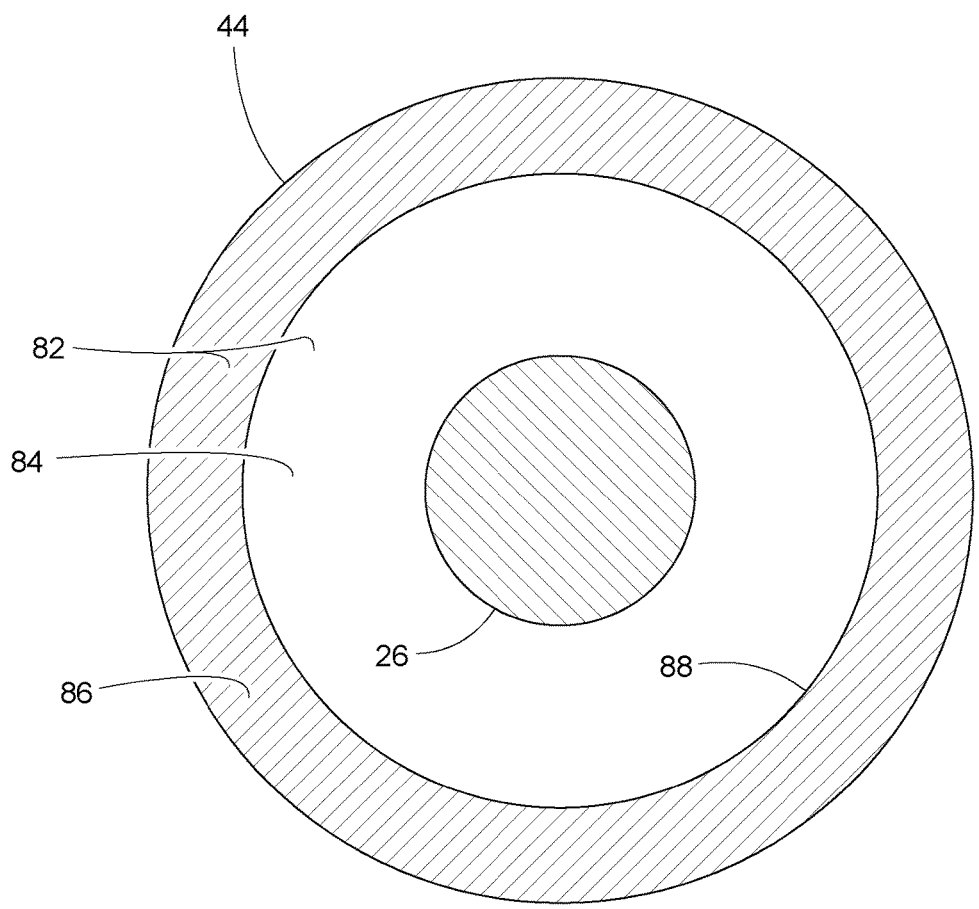
FIG. 15 is a cross-sectional view taken along line 15-15 of FIG. 14.
Figure 16:
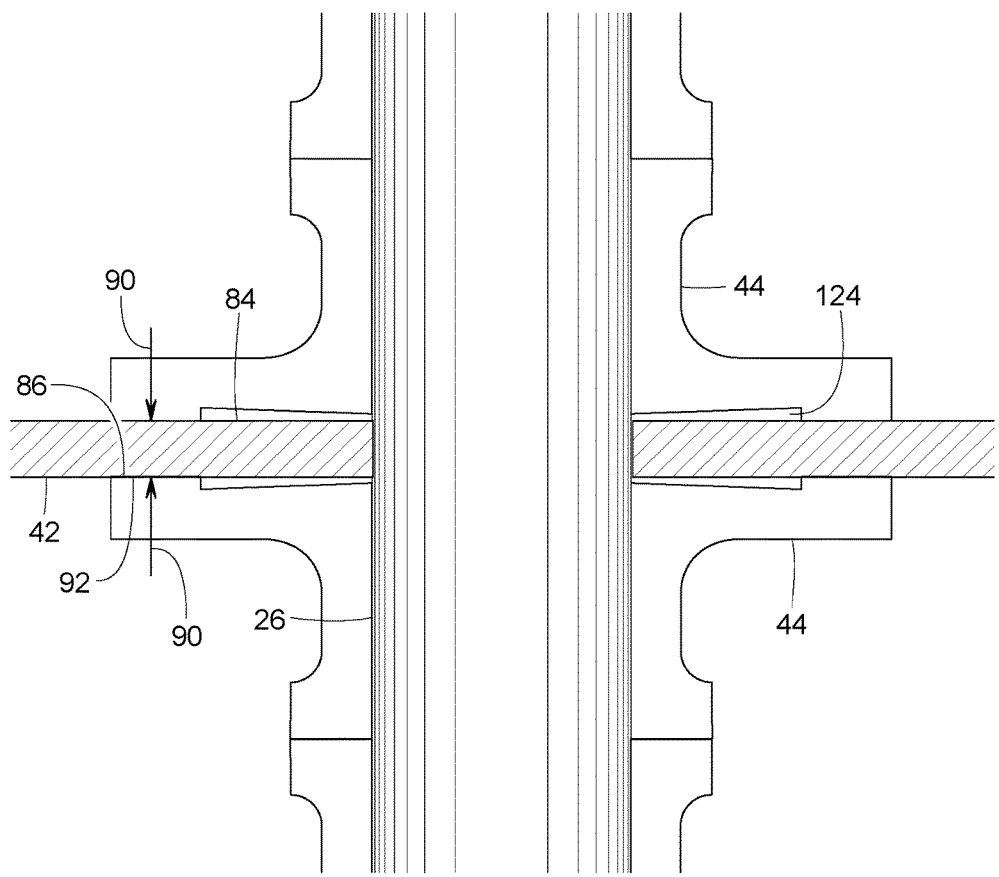
FIG. 16 is a view similar to FIG. 14 but showing the spacers clamped more tightly.
Figure 17:
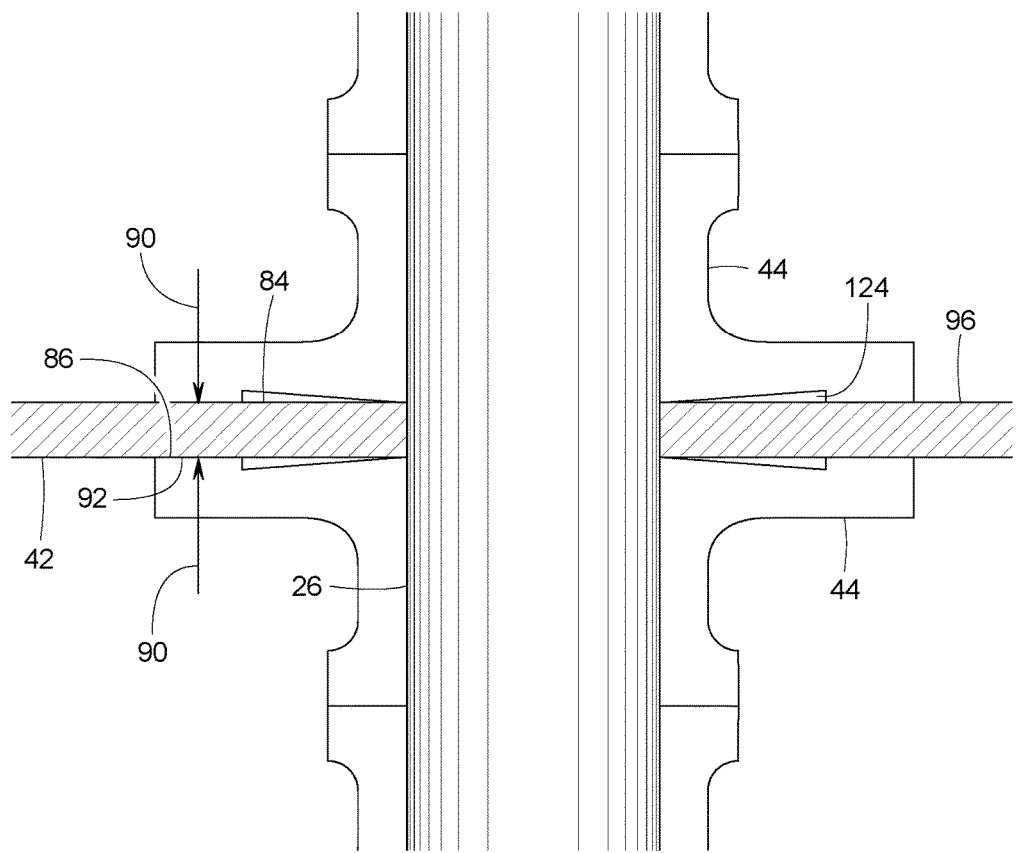
FIG. 17 is a view similar to FIG. 16 but showing the spacers clamped even more tightly.
Figure 18:
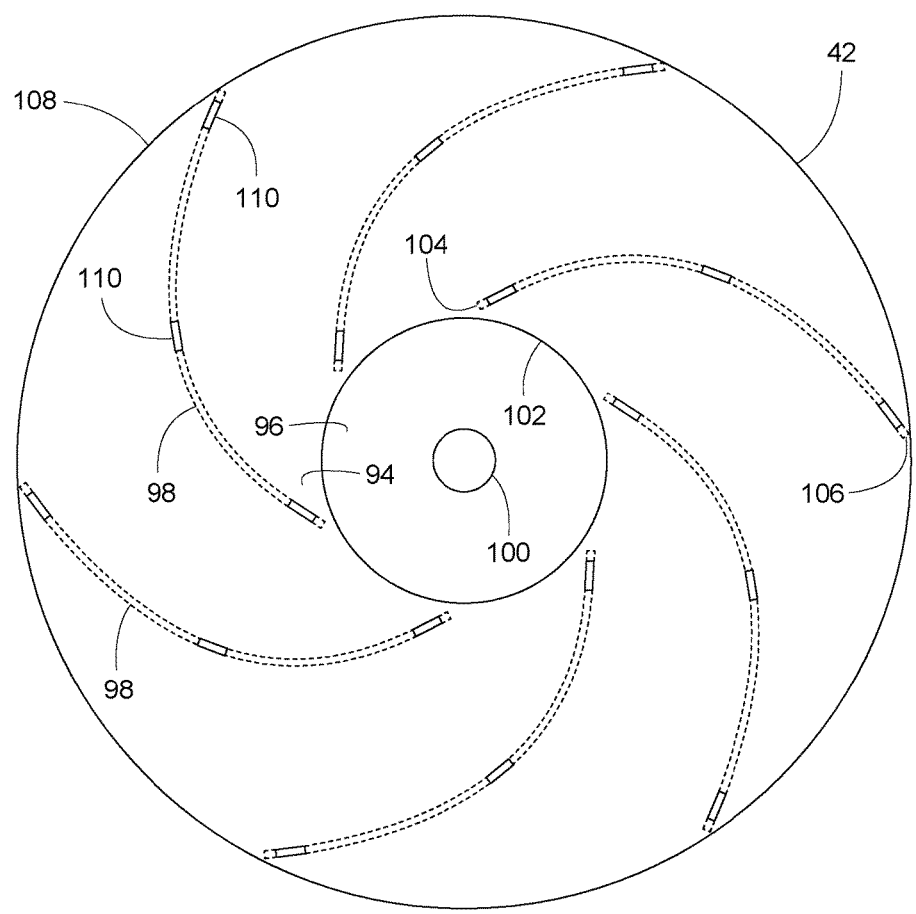
FIG. 18 is a bottom view of a fan wheel used in the example motor-driven fan shown in FIG. 1.

FIG. 14 shows that when nut 46 is tightened just lightly to exert nut-clamping force 90 of minimal magnitude, only first peripheral rim 86 engages the fan wheel's planar surface 92 while spacer 44 experiences little if any axial deflection. FIG. 16 shows that when nut 46 is tightened further to exert nut-clamping force 90 of moderate magnitude, still only first peripheral rim 86 engages the fan wheel's planar surface 92, but spacer 44 undergoes appreciable axial deflection. FIG. 17 shows that when nut 46 is tightened even further to exert nut-clamping force 90 of significantly higher magnitude, both first peripheral rim 86 and at least a portion of recessed surface 84 engage the fan wheel's planar surface 92, whereby spacer 44 experiences even more axial deflection. The chosen degree of nut tightness may depend on the fan's specific design and operating conditions. In some examples, particularly under severe operating conditions (e.g., 15,000 to 30,000 rpm and up to 15 psig) nut 46 is fully tightened to resiliently compress spacers 44 as shown in FIG. 17. Of course, nut 46 can be fully tightened for any operating conditions if so desired.

In some examples, as shown in FIGS. 14, 16 and 17, each fan wheel 42 is clamped between two opposing spacers 44 (e.g., a first spacer 44a and a second spacer 44b). Second spacer 44b has a second axial face 82b comprising a second recessed surface 84b, a second peripheral rim 86b, and a second step 88b extending in axial direction 28 between second recessed surface 84b and second peripheral rim 86b. Two spacers 44a and 44b in an opposing arrangement doubles the axial compressive distance to about 0.004 to 0.010 inches while the nut's exerted nut-clamping force 90 remains the same. In other words, a given nut-clamping force 90 provides twice the distance of compression when two spacers 44 are installed in an opposing arrangement.

Referring to FIGS. 18-21, some examples of motor-driven fan 10 have a fan blade design that resists blade tip bending under extreme centrifugal force. In the illustrated example, fan wheel 42 comprises an upstream disk 94, a downstream disk 96 and a plurality of curved fan blades 98 between the two disks 94 and 96. Downstream disk 96 has a shaft hole 100 for aligning fan wheel 42 to shaft 26. Upstream disk 94 has an air inlet hole 102 for receiving air 48 into fan wheel 42. Fan blades 98 extend lengthwise between the fan blade's inner leading edge 104, near air inlet hole 102, and an outer trailing edge 106 near an outer diameter 108 of fan wheel 42.

In the illustrated example, fan blades 98 and disks 94 and 96 are all made of aluminum sheet metal. To hold fan blades 98 in place, a plurality of sheet metal tabs 110 on fan blades 98 extend into a matching plurality of tab openings 112 in disks 94 and 96. After tabs 110 are inserted into their corresponding tab openings 112, tabs 110 are staked or otherwise affixed to disks 94 and 96 to complete the assembly of fan wheel 42.

Without careful consideration to the design details of fan wheels 42, problems may arise. For instance, due to the high speeds and temperatures of HVLP motor-driven fans, the fan blades between the two disks can become distorted during normal operation. Due to the fan blade's backward inclined orientation, the actual length of the fan blade might be roughly twice the radial distance between the inner diameter of air inlet hole 102 and the outer diameter 108 of disk 94. So, if the radial distance between the radially outermost tab 110 and the outer diameter 108 of disk 94 is, for example, 0.100 inches, then the fan blade might have a 0.200 inch tail distance (i.e., two times 0.100 inches) extending in a generally unsupported cantilevered manner beyond the fan blade's outermost tab.

Surprisingly, in some applications, centrifugal force is sufficient to bend the fan blade's tail section 114 radially outward. Tail section 114 is that portion of the fan blade that extends over a tail distance 116 generally unsupported between the fan blade's outermost tab 110 and the disk's outer diameter 108. This effect or vane shape change is most likely to occur in high power multistage HVLP applications because of the high air temperatures resulting from the typically small exhaust orifice for these HVLP motor-driven fans. With rotational speeds of 20,000 to 40,000 rpm, the centrifugal force coupled with the high temperatures tends to bend the outer tip of the fan blades. As this happens the fan wheels become unbalanced, thereby causing excessive vibration and early motor/turbine failure.

To overcome this problem, in some examples, it has been discovered that by decreasing tail distance 116 to no more than about 0.050 inches, blade deflection and resulting vibration is basically eliminated. Reducing tail distance 116 to zero, however, is not feasible because doing so would mean the radially outermost tab opening 112 would "break out" or be open to the disks' outer diameter 108, thus reducing the strength and integrity of the fan wheel.

Although reducing tail distance 116 to 0.050 inches or less works well for certain sized motor-driven fans, a suitable value of tail distance 116 can depend on certain other physical dimensions, material properties, and operating conditions of the motor-driven fan. In some examples, tail distance 116 is less than three times a blade material thickness 118 of fan blade 98. In addition, in some examples, tail distance 116 is such that a blade height 120 of fan blade 98 is at least five times greater than the fan blade's material thickness 118 and/or at least five times greater than tail distance 116.

With HVLP motor-driven fans, the differences in thermal expansion of aluminum and steel parts plus high inertial forces at startup can cause fan wheels 42 and spacers 44 to slip or shift relative to shaft 26 and nut 46. Such slippage can lead to subsequent vibration and premature failure. However, with consideration of the relative tensile strengths and thermal expansion of steel, aluminum and some polymers, certain part geometries and a polymeric adhesive 122 can be used advantageously to overcome these problems.

Figure 22:
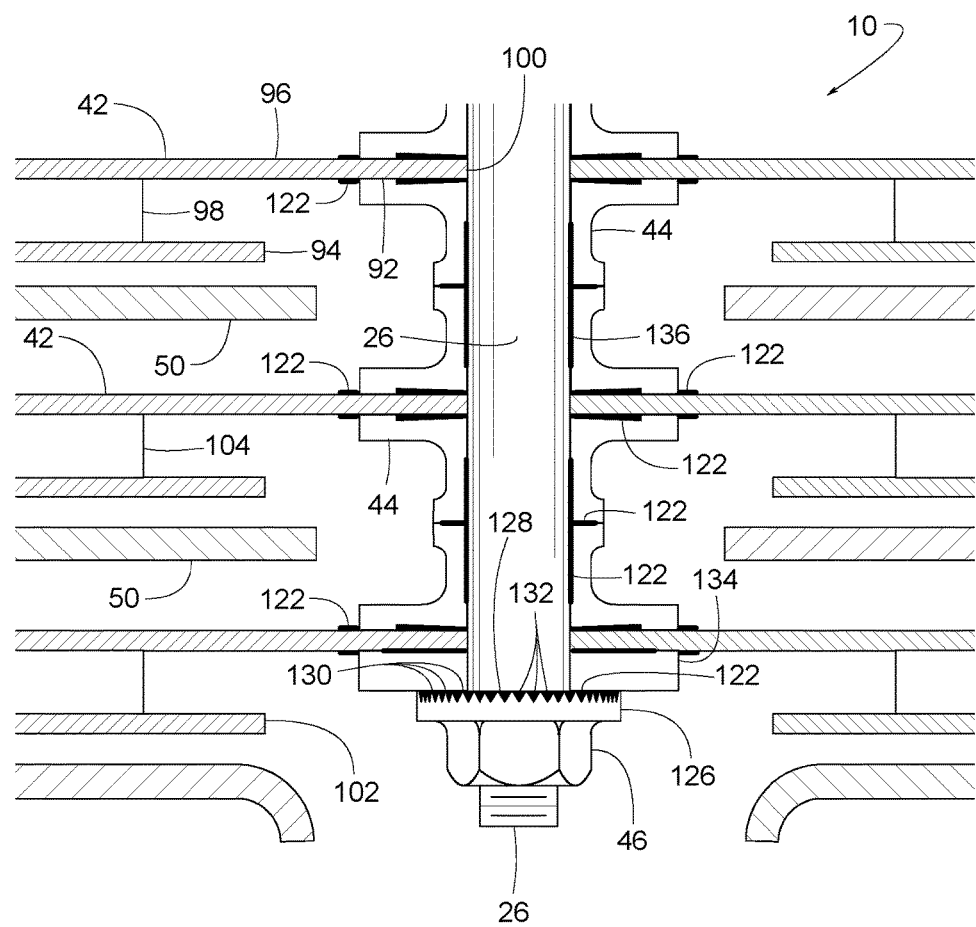
FIG. 22 is a front cross-sectional view similar to FIG. 16 but with the addition of an adhesive.

For instance, in some examples, adhesive 122 is applied to rotor 24, as shown in FIG. 22. In this example, adhesive 122 has a coefficient of thermal expansion that is much greater than the steel of shaft 26 and the aluminum of spacers 44 and fan wheels 42. Adhesive 122 also has a much lower yield tensile strength than that of steel and aluminum. These material properties in combination with certain physical features of spacers 44, nut 46, fan blades 42 and shaft 26 securely bond those pieces to each other.

In the illustrated example, counterbore 80 in spacer 44 creates a cavity 124 (FIGS. 14, 16 and 17) between the spacer's recessed surface 84 and the substantially planar surface 92 of the fan wheel's downstream disk 96. With respect to radial direction 28, cavity 124 is bound by the spacer's step 88 and either the outer diameter of shaft 26 (FIGS. 14 and 16) or the area where the spacer's recess surface 84 might engage the fan wheel's disk 96 near shaft 26 (FIG. 17).

In the example where cavity 124 is filled with adhesive 122 and is bound by the outer diameter of shaft 26, as shown in FIGS. 14 and 16, one or more interesting phenomena seem to occur. As rotor 24 heats up during operation, spacer 44 expands radially due to thermal expansion. Adhesive 122 within cavity 124 tries to expand even more due to adhesive 122 having a much higher coefficient of thermal expansion than that of the aluminum spacer 44. Spacer 44, however, has a much higher yield tensile strength and is sufficiently strong to restrict the attempted radial outward expansion of adhesive 122. Thus, adhesive 124 being trapped within the confines of cavity 124 exerts pressure against its bounding surfaces, such as radial pressure against the outer diameter of shaft 26 and axial pressure between spacer 44 and disk 96. This radial and axial pressure seems to provide a secure holding force between shaft 26 and its adjoining parts, spacer 44 and fan wheel 42. In examples where adhesive 124 does not take a set within cavity 124, it is speculated that the relatively fluid or gelatin adhesive 124 provides a dampening effect.

In addition or alternatively, adhesive 124 is applied to nut 46. In the example illustrated in FIG. 22, nut 46 comprises an integral flange 126 having an axial face 128 that includes a plurality of serrations 130, which in turn define a plurality of grooves 132. Partially coating grooves 132 with adhesive 122, as shown in FIG. 22, and/or trapping some adhesive 122 between nut 46 made of steel and an abutting element 134 (e.g., a washer, a spacer, a disk, etc.) made of steel or aluminum with steel shaft 26 extending between nut 46 and element 126 results in thermal expansion possibly causing adhesive 122 to exert axial pressure against nut 46 and element 134. In some examples, spacers 44 and disks 96 are made of an aluminum alloy having a coefficient of thermal expansion of about $22 \times 10^{-6}$ m/mK and a yield tensile strength of about 35,000 psi, shaft 26 and nut 46 are made of steel having a coefficient of thermal expansion of about $12 \times 10^{-6}$ m/mK and a yield tensile strength of at least 36,000 psi, and adhesive 122 is a LOCTITE 620 having a coefficient of thermal expansion of about $80 \times 10^{-6}$ m/mK and a shear or yield tensile strength of less than 4,000 psi. It should be noted that LOCTITE 620 is just one example of a suitable polymeric adhesive and other example adhesives are well within the scope of the invention. LOCTITE is a registered trademark of Henkel AG & Co. KGaA of Dusseldorf, Germany.

In some examples, adhesive 122 is disposed within a radial gap 136 between shaft 26 and spacer 44, as shown in FIG. 22. This provides an even more securely bonded rotor assembly. To provide further bonding or radial restraining forces, some examples of fan 10 have adhesive 122 extending radially beyond peripheral rim 86 of spacer 44.

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:

1. A motor-driven fan comprising:
   an inboard bracket defining an outlet;
   an outboard bracket;
   a stator comprising a plurality of laminations;
   a screw clamping the stator between the inboard bracket and the outboard bracket;
   an armature comprising a shaft being elongate in an axial direction, a commutator supported by the shaft, and a set of windings being electrically coupled to the commutator;
   a set of bearings mounted to at least one of the inboard bracket and the outboard bracket, the set of bearings providing the shaft with support in a radial direction that is perpendicular to the axial direction, the set of bearings further supporting the shaft in the axial direction so as to position the set of windings proximate the stator;
   a fan housing connected to the inboard bracket, the fan housing defining an inlet that is in fluid communication with the outlet of the inboard bracket;
   a plurality of fan wheels and a plurality of spacers being in an axially stacked arrangement within the fan housing;
   a nut screwed onto the shaft and thereby exerting a nut-clamping force that holds the plurality of fan wheels and the plurality of spacers to the shaft; and
   an adhesive between the shaft and at least one of the nut, the plurality of fan wheels and the plurality of spacers, the shaft being comprised of a first material having a first coefficient of thermal expansion, and the spacers being comprised of a second material having a second coefficient of thermal expansion, the adhesive having a third coefficient of thermal expansion, the third coefficient of thermal expansion being greater than the first coefficient of thermal expansion, and the third coefficient of thermal expansion being greater than the second coefficient of thermal expansion, wherein the plurality of spacers includes a spacer, the plurality of fan wheels includes a fan wheel, the spacer has an axial face comprising a recessed surface, a peripheral rim, and a step extending in the axial direction between the recessed surface and the peripheral rim, both the recessed surface and the peripheral rim are urged by the nut-clamping force toward a substantially planar surface of the fan wheel, the adhesive extends between the recessed surface of the spacer and the substantially planar surface of the fan wheel, and the adhesive also extends radially beyond the peripheral rim of the spacer.

2. The motor-driven fan of claim 1, wherein the third coefficient of thermal expansion is greater than a sum of both the first coefficient of thermal expansion and the second coefficient of thermal expansion.

3. The motor-driven fan of claim 1, wherein the first material has a first yield tensile strength, the second material has a second yield tensile strength and the adhesive has a third yield tensile strength, the third yield tensile strength is less than the first yield tensile strength, and the third yield tensile strength is less than the second yield tensile strength.

4. The motor-driven fan of claim 1, wherein the first material comprises steel and the second material comprises aluminum.

5. The motor-driven fan of claim 1, wherein the nut includes an axial face having a plurality of serrations that define a plurality of grooves, and the adhesive extends into the plurality of grooves.

6. The motor-driven fan of claim 1, wherein the armature rotates at a speed of at least 15,000 rpm, and the outlet is at an outlet pressure of less than 15 psig.

7. A motor-driven fan comprising:
an inboard bracket defining an outlet;
an outboard bracket;
a stator comprising a plurality of laminations;
a screw clamping the stator between the inboard bracket and the outboard bracket;
an armature comprising a shaft being elongate in an axial direction, a commutator supported by the shaft, and a set of windings being electrically coupled to the commutator;
a set of bearings mounted to at least one of the inboard bracket and the outboard bracket, the set of bearings providing the shaft with support in a radial direction that is perpendicular to the axial direction, the set of bearings further supporting the shaft in the axial direction so as to position the set of windings proximate the stator;
a fan housing connected to the inboard bracket, the fan housing defining an inlet that is in fluid communication with the outlet of the inboard bracket;
a plurality of fan wheels and a plurality of spacers being in an axially stacked arrangement within the fan housing;
a nut screwed onto the shaft and thereby exerting a nut-clamping force that holds the plurality of fan wheels and the plurality of spacers to the shaft; and
an adhesive between the shaft and at least one of the nut, the plurality of fan wheels and the plurality of spacers, the shaft being comprised of a first material having a first coefficient of thermal expansion, and the spacers being comprised of a second material having a second coefficient of thermal expansion, the adhesive having a third coefficient of thermal expansion, the third coefficient of thermal expansion is greater than a sum of both the first coefficient of thermal expansion and the second coefficient of thermal expansion, the first material has a first yield tensile strength, the second material has a second yield tensile strength and the adhesive has a third yield tensile strength, the third yield tensile strength is less than the first yield tensile strength, and the third yield tensile strength is less than the second yield tensile strength, the first material comprises steel, the second material comprises aluminum, and the adhesive comprises a polymer, wherein the plurality of spacers includes a spacer, the plurality of fan wheels includes a fan wheel, the spacer has an axial face comprising a recessed surface, a peripheral rim, and a step extending in the axial direction between the recessed surface and the peripheral rim, both the recessed surface and the peripheral rim are urged by the nut-clamping force toward a substantially planar surface of the fan wheel, the adhesive extends between the recessed surface of the spacer and the substantially planar surface of the fan wheel, and the adhesive also extends radially beyond the peripheral rim of the spacer.

8. The motor-driven fan of claim 7, wherein the plurality of spacers includes a spacer, and the adhesive is disposed within a radial gap between the shaft and the spacer.

9. The motor-driven fan of claim 7, wherein the adhesive extends between the first material and the second material.

10. A motor-driven fan comprising:
an inboard bracket defining an outlet;
an outboard bracket;
a stator comprising a plurality of laminations;
a screw clamping the stator between the inboard bracket and the outboard bracket;
an armature comprising a shaft being elongate in an axial direction, a commutator supported by the shaft, and a set of windings being electrically coupled to the commutator;
a set of bearings mounted to at least one of the inboard bracket and the outboard bracket, the set of bearings providing the shaft with support in a radial direction that is perpendicular to the axial direction, the set of bearings further supporting the shaft in the axial direction so as to position the set of windings proximate the stator;
a fan housing connected to the inboard bracket, the fan housing defining an inlet that is in fluid communication with the outlet of the inboard bracket;
a plurality of fan wheels and a plurality of spacers being in an axially stacked arrangement within the fan housing, the plurality of fan wheels includes a fan wheel having a substantially planer surface, the plurality of spacers includes a spacer, the spacer having an axial face comprising a recessed surface, a peripheral rim, and a step extending in the axial direction between the recessed surface and the peripheral rim;
a nut screwed onto the shaft, the nut includes an axial face having a plurality of serrations that define a plurality of grooves, and the nut exerting a nut-clamping force that holds the plurality of fan wheels and the plurality of spacers to the shaft, both the recessed surface and the peripheral rim of the spacer being urged by the nut-clamping force toward the substantially planar surface of the fan wheel; and
an adhesive extending into the plurality of grooves of the nut, the shaft being comprised of a first material having a first coefficient of thermal expansion, and the spacers being comprised of a second material having a second coefficient of thermal expansion, the adhesive having a third coefficient of thermal expansion, the third coefficient of thermal expansion is greater than a sum of both the first coefficient of thermal expansion and the second coefficient of thermal expansion, the first material having a first yield tensile strength, the second material having a second yield tensile strength and the adhesive having a third yield tensile strength, the third yield tensile strength being less than the first yield tensile strength, the third yield tensile strength being less than the second yield tensile strength, the first material comprising steel, the second material comprising aluminum, the adhesive comprising a polymer, the adhesive being disposed within a radial gap between the shaft and the spacer, the adhesive extending between the recessed surface of the spacer and the substantially planar surface of the fan wheel, and the adhesive also extending radially beyond the peripheral rim of the spacer.

11. The motor-driven fan of claim 10, wherein the armature rotates at a speed of at least 15,000 rpm, and the outlet is at an outlet pressure of less than 15 psig.

* * * * *